United States Patent [19]

Scott

[11] Patent Number: 5,068,582

[45] Date of Patent: Nov. 26, 1991

[54] BRUSHLESS PULSED D.C. MOTOR

[75] Inventor: Kenneth C. Scott, San Diego, Calif.

[73] Assignee: A. O. Smith Corporation, Milwaukee, Wis.

[21] Appl. No.: 529,920

[22] Filed: May 29, 1990

[51] Int. Cl.$^5$ .............................................. H02P 6/02
[52] U.S. Cl. .................................... 318/254; 318/138
[58] Field of Search ......................... 318/138, 254, 439

[56] References Cited

U.S. PATENT DOCUMENTS

| | | | |
|---|---|---|---|
| 4,027,215 | 5/1977 | Knight | 318/341 |
| 4,238,717 | 12/1980 | Knight | 318/341 |
| 4,467,320 | 8/1984 | McPhee | 340/347 SY |
| 4,492,902 | 1/1985 | Ficken et al. | 318/254 |
| 4,492,903 | 1/1985 | Knight | 318/341 |
| 4,495,450 | 1/1985 | Tokizaki et al. | 318/138 |
| 4,528,485 | 7/1985 | Boyd, Jr. | 318/138 |
| 4,642,537 | 2/1987 | Young | 318/254 |
| 4,835,448 | 5/1989 | Dishner et al. | 318/254 |
| 4,922,169 | 5/1990 | Freeman | 318/254 |

Primary Examiner—Bentsu Ro
Attorney, Agent, or Firm—Andrus, Sceales, Starke & Sawall

[57] ABSTRACT

A commutated brushless dc motor includes a detector which senses the zero crossings of the unenergized winding. A timing system includes a reference capacitor coupled to the detection unit and charged to a voltage proportional to zero crossing time. The voltage is compared to a capacitor charged from a constant current source. At a percentage level of the reference capacitor, a commutating pulse is applied to a winding commutating circuit. The incoming pulses drive a counter and actuates a programmed decoder which generates output signals for commutation of the windings and selection of the next unenergized winding. The detector is selectively connected to sense the induced voltage in the unenergized winding. To start the motor, a separate charging circuit creates initial pulses to energize the windings and accelerate the motor. At a given speed, the zero crossing circuit is enabled. An integrated circuit system has the zero crossing signals applied to a resettable counter which counts at a fixed rate between zero crossings. The count is latched and is proportional to the time between zero crossings. The counter signal and the latched signal are compared to generate the commutating pulse.

16 Claims, 3 Drawing Sheets

BRUSHLESS PULSED D.C. MOTOR

BACKGROUND OF THE PRESENT INVENTION

This invention relates to a pulsed brushless direct current (dc) motor and particularly to such a motor including an electronic control for energizing of the motor to maintain motor operation in the presence of varying motor torques, available line voltages and the like.

Brushless dc motors have been developed for precise precision drives in various applications. Brushless dc motors, for example, are now widely used in disk drives for computing systems. In such motors, a rotor includes fixed polarity poles. The stator winding includes a plurality of spaced windings. Energizing of the windings in sequence with a dc signal generates an interacting field with that of the rotor poles to establish rotation of the rotor. The pulsing of the stator windings at predetermined orientations of the rotor with respect to the stator windings is necessary to provide maximum torque per power pulse application of the windings, and is critical in order to maintain and establish a desired speed characteristic with varying torque, voltages and the like. A widely used system includes Hall cell sensors mounted to sense the position of the rotor relative to the stator. The output of the Hall cell produces an appropriate signal to the control system for switching power from one winding to another at the proper commutation time for the windings. The Hall cell elements of course contribute to the cost of the motor, which is further increased because of the necessity to provide precise and accurate mounting of the sensors as well as the additional leads from the motor proper to the electronic control system. Generally, the system requires a specially shielded lead, and each motor is more or less constructed as a custom design and does not lend itself to building of a single standard motor line. Hall cell elements are semi-conductor based structures, therefore have temperature limitations which must be considered, and inherently raise a problem with respect to reliability of the motor operation. Motor derating may be specified to anticipate adverse temperature conditions.

An alternative sensing system which has been suggested is based on an electronic sensing system including directly sensing the electrical characteristic in an unenergized winding of the stator for detecting the desired time for commutating the motor windings. U.S. Pat. No. 4,027,215 which issued May 31, 1977 discloses a zero crossing detection system for brushless dc motors to generate commutating signals. That patent also discusses the background of dc and A.C. machines and further discusses some of the disadvantages of the brushless dc motors which rely on separate sensors for detecting rotor position and thereby the appropriate commutation times. The '215 patent provides a two stage counter controlled by the output of a signal induced in the unenergized winding for purposes of detecting a proper commutation time. Thus, in a three phase stator winding, the three power coils are equicircumferentially spaced or wound on the stator. Each winding is pulsed during the period when the other two windings would generate a signal less than the signal of the selected winding. Thus, assuming a three phase time sequence with a sine wave characteristic, each winding would be energized during its positive half cycle and particularly between the period between 30° and 150° of such half cycle, or for the 120° of each cycle of rotation, with successive windings being energized sequentially to energize only two windings simultaneously. The system used therein detects the zero crossing and then activates a pair of counters for each phase to monitor the zero crossings and the particular time of commutation. Actual commutation is created by a plurality of solid state switches interconnecting of the motor winding dc supply. The electronic control system as disclosed in that patent provides a high degree of complexity to avoid the necessity of the separate position sensing elements. The use of the up-down counters provides for counting of the unit at one rate, such as counting up at one rate during the zero crossing and then counting downwardly at such rate to generate a pulse at a particular desired delay time period and then recycling of the system to maintain the continued operation of the two stage counter system. Until the motor reaches a certain selected speed of operation, the unenergized winding does not provide an appropriate signal for monitoring and controlling commutation. The motor is therefore started with a time spaced pulsed control with sufficient energy supply to initiate the operation of the motor as a more or less conventional stepping motor wherein the windings are sequentially energized to start the motor and accelerate the motor to a speed wherein an effective detectable voltage appears in the unenergized winding to permit the continued for operation with the zero crossing detection. Other controls are also disclosed in the patent to provide for varying of the speed and centering of the pulses to maintain maximum efficiency and the like.

SUMMARY OF THE PRESENT INVENTION

The present invention is particularly directed to a commutated brushless dc motor providing a simple, effective and reliable sensing of the zero crossings and generating commutating pulses based on the zero crossing detection.

Generally in accordance with the present invention, a timing device is coupled to the motor stator and is reset at each zero crossing. The timing device begins to monitor the time until the next zero crossing and generates an electrical signal proportional to such time. The zero crossing signal is latched or recorded at the next zero crossing and the latched signal used for establishing the next commutating pulse, and essentially simultaneously resets the timing device to initiate a new recycle to record the next period of the zero crossing. The system repeats the above sequence with continuous repetitive recycling, latching and recycling of the timing device. The commutating control responds to a proportion of the latched signal to generate the desired commutating of the stator winding. Thus, with the three phase dc brushless motor, each winding is commutated "on" at the 30° angle in the respective related rotor rotation and commutated "off" at 150° such that the three windings are sequentially commutated "on" for successive periods of 120°.

The system is particularly adapted to a very simple, reliable and effective electronic control and can be incorporated into a capacitor based electronic control, an integrated circuit electronic control or the like.

In one embodiment of the present invention, a capacitive charging circuit is provided for monitoring of the zero crossing time and the generation of a commutating signal at an appropriate time based on the total capacitor charge during the zero crossing time. In particular, the referenced capacitor is coupled to a zero crossing detection unit input and is triggered at each zero crossing to record the voltage created at the last zero crossing. More particularly, a timing capacitor is coupled to a constant current source. The capacitor is reset at each zero crossing, with essentially immediate initiation of the next capacitor charging cycle. The timing capacitor is charged at a constant rate related to the constant current source. When the charge equals a percentage level of the stored charge on the reference capacitor, a detection circuit conducts and generates a commutating pulse. The commutating pulse is applied to an appropriate commutating circuit to control the commutation of the several windings. The unit can use a simple counter to detect the incoming pulse signals which identify the on/off times for each of the individual windings in sequence. The output is applied to a programmed decoder which generates output signals for commutation of the windings and also actuates the zero crossing detection circuit to select the unenergized winding in appropriate sequence.

The zero detector includes a simple voltage sensing unit coupled to the several windings and the reference or common connection to provide a voltage related thereto with respect to such reference. The switch connects each of the sensing units to a pulse generating circuit with the switches activated in accordance with the winding energization to produce an output for sensing the induced voltage in the unenergized winding. The outputs are connected in common with a switching circuit for comparison with the reference signal. Thus, whenever the switch is turned "on", it provides an appropriate induced voltage signal to the comparator. When the comparison of the sensed induced voltage and the references signal match, a monostable circuit or the like is triggered to generate a sharp pulse signal at the zero crossing. With the three winding motor, there will be six pulses per rotor revolution. The pulses are connected as the input to the commutating angle generator which in turn generates the commutating pulses to the commutation circuit as such. A counter provides a binary output identifying the six pulses received and fed into the decoder for generating of the appropriate pulses for sequential energizing the windings and simultaneously resetting the zero crossing circuit to detect the appropriate zero crossing of the unenergized winding.

Prior to the motor reaching at an appropriate speed to generate the triggering pulses, a separate charging circuit is provided for establishing an initial series of stepping pulses at a constant rate. The initial charging circuit serves to sequentially energize the three windings and accelerate the motor to approach operating speed, at which time the zero crossing circuit is enabled to activate the motor under the desired commutated mode. The stepping mode is established and maintained at least until the motor reaches a sufficient speed to generate effective zero crossing pulse signals from the zero crossing detector. This circuit may include a comparator having its reference input set at a fixed percentage voltage of the voltage generated by the triggering or timing capacitor under normal commutated operation of the motor. The comparator is automatically disabled once the zero crossing commutating mode is instituted.

To incorporate the system into an integrated circuit, the zero crossing signals are applied to an electronic counter. The counter is initialized at a first zero crossing, which initiates a count at a fixed rate until the next zero crossing. The counter therefore generates a time signal directly related to the time between the successive zero crossings in an induced winding. The counter data is latched into a suitable latch unit at the end zero crossing and provides a count signal directly corresponding to the total time between the zero crossings. This time essentially corresponds to a time of 60° in the revolution of the rotor. The counter is simultaneously reset at the latch time and begins a new count. When the running counter reaches a value equal to one-half of the latched value, a commutating pulse is generated to commutate the windings, but the counter continues to count to establish the next reference signal.

In the steady state, the system thus generates a stator flux vector which steps about the machine in increments of 60°. The vector leads the actual rotor flux by an average angle of 90° which corresponds to the desired angle for maximum torque transfer. A slight angle error may be introduced as a result of delays between measurement of the angle positions as well as the resulting implementation based on such measurements. The system however provides a closed loop control which tends to automatically modify and correct for such error.

DESCRIPTION OF THE DRAWINGS FIGURES

The drawings furnished herewith illustrate the best mode presently contemplated for the invention and are described hereinafter.

In the drawings.

DESCRIPTION OF THE ILLUSTRATED EMBODIMENT

Figure 1:
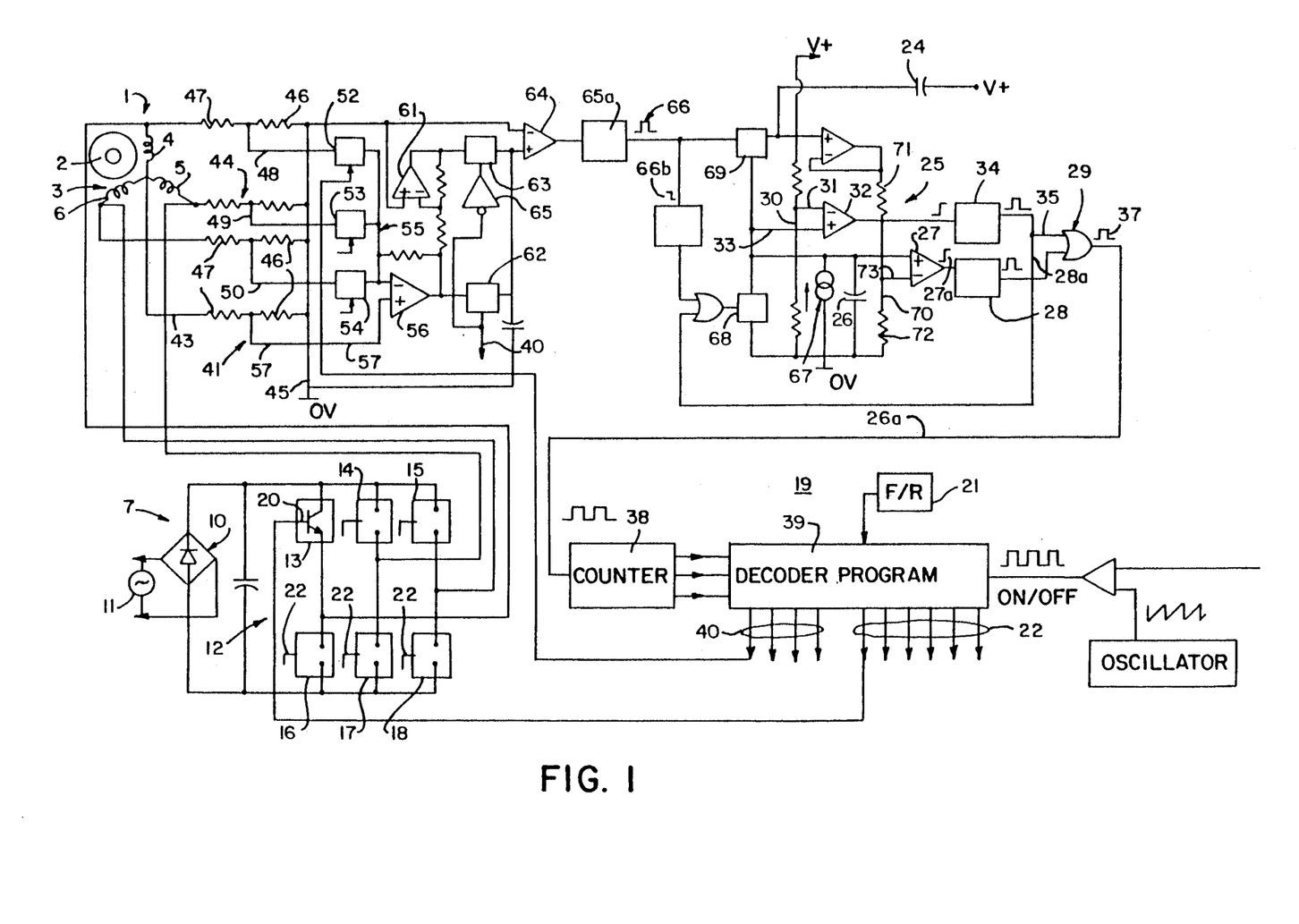
FIG. 1 is a schematic circuit of the drive and control for a brushless motor illustrating an embodiment of the invention.

Referring to the drawings and particularly to FIG. 1, a permanent magnet dc motor 1 is illustrated including a rotor 2 coupled to a three-phase wye connected stator unit 3. The stator unit 3 includes three separate windings 4, 5 and 6 distributed in 120° spaced relation. The motor 1, as schematically illustrated, is driven by sequential energization of the three individual windings 4, 5 and 6. The magnetic field established by each winding is coupled to the magnetic field of the rotor 2 to create the turning force on the rotor for driving a suitable load, not shown. In accordance with well known practice, the windings are driven from a switched dc power supply 7.

In the illustrated embodiment, the three windings 4, 5 and 6 are shown connected to the dc power supply 7 which includes a full wave rectifier 10 connected to an A.C. source 11. A switching bridge network 12 includes six solid state switches 13, 14, 15, 16, 17 and 18, shown as switching transistors. Pairs of the several switches 13–18, inclusive, are simultaneously energized and turned on to sequentially connect the windings 4, 5 and 6 to the dc power supply 7.

The particular sequence of activating switches 13–18 and energizing windings 4, 5 and 6 is determined by the desired direction of rotation. Thus, energizing of windings in the sequence of windings 4, 5 and 6 develops first or forward rotation and the reverse sequence of winding 6, 5 and 4 develops the opposite or reverse rotation as a result of the creation of the corresponding magnetic poles in the stator relative to the rotor.

A drive controller 19 is actuated by a trigger or winding switch signal to turn-off an "on" switch and turn-on an "off" switch for the next winding to be energized to establish the sequential energization of the windings, as more fully developed hereinafter.

The controller may be a commercially available programmable controller which sequentially transmits signals to the gates or turn-on input element 20 of the power switch transistor 13–18 in the proper sequence. The sequence is set by a "forward/reverse" input unit 21 which may be manually set as shown by a switch unit, or connected to a suitable condition responsive control or the like. The controller includes individual "gating" output lines 22 connected to the input terminals or elements 20 of the respective transistors 13–18, inclusive.

The sequential actuation pulsing of switches 13–18 establishes at least one winding which, at any given instance, is connected to positive power and one winding which is not connected to the power supply 7. The magnetic field of the rotor 2 however cuts the unenergized winding and induces a voltage and current flow in the unenergized winding which is detected for determining the position of the rotor 2 relative to the windings. The induced voltage is typically a sine wave, and with the illustrated three phase winding configuration, a three phase induced voltage is created, as typically shown in FIG. 2.

For optimum motor operation, each winding is energized for a period related to the intersection of the several winding voltages in a three phase sine wave system. Thus, each winding is energized and supplied with positive power for 120 degrees between the 30 degree position and the 150 degree point in each 360 degrees of rotation. The direct detection of the voltage intersections is complex.

Figure 2:
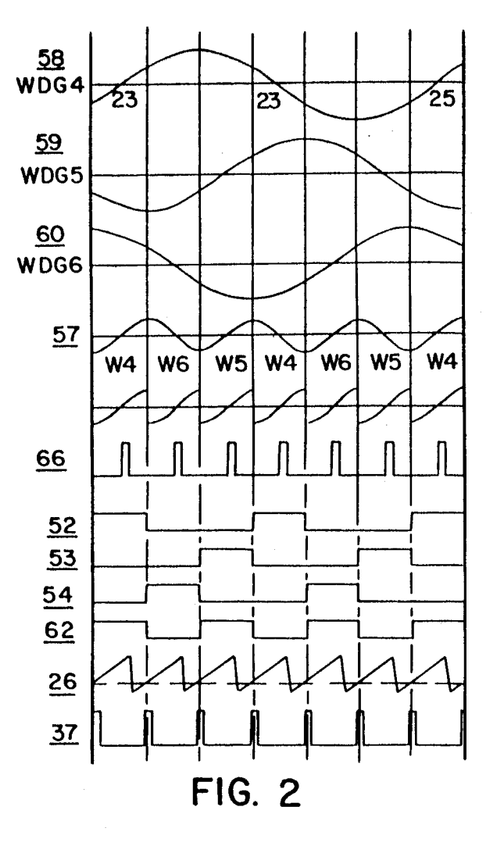
FIG. 2 is graphically illustrating of the motor waveforms and the timing control signals.

However, the intersections are directly related to the zero crossing points of the several induced winding voltages as at 23 in FIG. 2, and by precisely 30 degrees. In the present invention, a driver and timing circuit 25 for the controller 19 generates a trigger signal directly proportional to the time period between each zero crossing 23, and the following 30 degree point of the monitored wave and is created by direct monitoring of the zero crossing points 23. The zero crossing signal is generated during each period by charging a storage capacitor 26 beginning with each zero crossing and ending with the next zero crossing. The signal is stored in a suitable signal storage unit, shown as a capacitor 24. A trigger signal is generated equal to the fixed percentage of the stored signal equal to the charge created during 30 degree rotation of the rotor 2. The new zero crossing related signal in capacitor 26 is compared with the switch reference signal from capacitor 24, and when the new zero crossing related signal equals the switch reference signal, a trigger or switch signal is generated at an output line 26a and connected to the controller to sequentially turn-off the power to one winding connected to the power supply 7 and turn-on the power to the next proper winding of the stator unit, with the cycle automatically being reinitiated and repeated. Thus, the zero crossing related signal continues to build in the capacitor 26 to the next following zero crossing, at which time the signal is stored in capacitor 24 to produce a new percentage signal level and capacitor 26 is reset and simultaneously again charged such that another new zero crossing related signal is built in capacitor 26 to produce the next succeeding trigger signal.

The output voltage of the reference capacitor 24 and the capacitor 26 are connected to the opposite inputs of an amplifier comparator 27. When the reference signal voltage is matched by the increasing voltage on the capacitor 26, which is now being charged to record the next zero crossing, the comparator 27 output switches to a high level as shown at 27a. The high level signal is applied to a monostable circuit 28 30 to generate a pulse signal 28a for signally switching of the windings. In the illustrated embodiment of the invention, the pulse signal 28a is connected to an OR gate 29 connected to output line 26a. The OR gate transmits the signal to the controller 19 and thereby initiates actuation of the switching circuit and changing energization from one winding to another.

The OR gate 29 is used to control sequential switching under start-up conditions and normal operating condition. A turn-on circuit 29a is provided for providing periodic pulse signals to the gate 29 for initiating the start-up of the motor and until the rotor 2 speed is sufficient to induce a signal in the unenergized winding for actuating the drive circuit.

In the illustrated embodiment of the invention, the start-up circuit includes a voltage dividing network 30 connected to the circuit supply, with a fixed reference voltage line 31 from the network connected as a first input to an amplifier comparator 32. The second input of the comparator 32 is connected directly by a line 33 to the capacitor 26. During the initial starting, the motor acceleration is controlled by the charging of the compacitor 26 to the percentage of the constant reference voltage from the voltage dividing network 30. The start comparator 32 thus generates a series of step signals. A monostable unit 34 is connected to the output of the comparator 32 and generates time spaced pulse signals which are interconnected by a lead 35 to a second input of the OR gate 29. The start-up circuit thereby provides a series of constant time spaced signals applied to the controller 19 which operate the motor as a stepping motor and accelerates the motor.

The trigger pulses 37 transmitted from the start-up circuit of the zero crossing circuit via the gate 29 are supplied to the controller 19 which actuates a counter 38 and creates a three bit signal for each of pulses in groups of 6. Thus, each 360° rotation of rotor 2 creates six zero crossings and thus the required actuating of switches 13–18. A circuit decoder is connected to the digital output of the counter and identified each pulse within the sequence for each rotation. The circuit decoder 39 is set to initiate energization with one winding for forward rotation and another for reverse rotation, as selected by operation of input unit 21. The series of pulse signals 37 identifies which winding was last energized and through the forward/reverse input 21 which winding is next to be energized. The decoder 39 further provides information as to the next unenergized winding 4, 5 or 6 to be monitored. Four signal selection lines 40 from the decoder 39 are coupled to a zero crossing detection circuit 41 and provide appropriate turn-on to the timing circuit 25 for selection of winding 4, 5 or 6 for monitoring.

The three windings 4, 5 and 6 are shown connected in a wye or star configuration, with a common or neutral reference connection of the three windings tied to a dc common or reference line 43. The outer ends of the three windings and the neutral line 43 are separately connected via a similar coupling circuits 44 to the zero crossing detecting circuit 41. Each coupling circuits 44 is a series resistors networks similarly connecting each winding 4, 5 and 6 to ground or zero reference line 45 of the circuit. Each network 44 includes a pair of voltage dividing resistors 46 and 47 to establish an attenuated induced motor voltage signal. Separate signal lines 48, 49, 50 and 51 are similarly connected to each signal tap at the common connection of the resistors 46 and 47 of the circuits 44, respectively. A separate gated switch 52, 53 and 54 connects each winding network or circuit 44 to a common signal line 55, which is connected to one input of an amplifier 56. The common or neutral line network 44 is connected to the second input of the amplifier 56 by a line 57. A gated switch 52, 53 or 54 for the unenergized winding 4, 5 or 6, respectively, is turned on to monitor the induced voltage in the corresponding winding for tracking the induced voltage passing through a zero crossing. The switches 52, 53 and 54 are thus activated by the controller 19 in the proper sequence and in timed relation to actuation of the power switches 13-18. The zero crossing signal transmitted is the portion of the induced voltage as shown at 57 in FIG. 2. FIG. 2 illustrates the sensed induced voltages in the unenergized windings 4, 5 and 6 at 58, 59 and 60, respectively. Thus, the windings sequentially are actuated to generate the zero crossing signal at the output of the amplifier 56. Every other zero crossing signal is negative going and the tracked signal from the amplifier 56 is then negative going. Each negative going signal is inverted by an amplifier 61 to provide positive going zero crossing signals at each zero crossing.

Gated switches 62 and 63 selectively and alternately connect the outputs of the amplifiers 56 and 61 to the input of an output amplifier comparator 64. The gated switches 62 and 63 are actuated in synchronism with the switching of the windings to transmit the induced voltage during each zero crossing from a first polarity, such as a positive to a negative polarity and a negative to a positive polarity. The controller lines 40 include a fourth line connected to switch 62. An inverter 65 connects the fourth line 40 to the gate 63, and results in the alternate operation of gates 62 and 63.

Amplifier comparator 64 continuously compares the induced voltage with the "0" reference and at the zero voltage of the sensed waveform an output signal is generated. A pulse signal generator 65, shown as a monostable circuit, is connected to the output of the comparator 64 and triggered by the leading edge of the signal to generate a sharp zero crossing pulse signal 66 in the form of a sharp pulse and, as separately shown applied to the circuit 25, having a leading edge 66a and a trailing edge 66b. The pulse signal 66 is coupled to the timing circuit 25 to selectively set the charge and voltage in capacitor 24 and reset timing capacitor 26 to initiate the start of a new zero crossing voltage and thereby establish the series of triggering signals, as follows.

More particularly, the timing capacitor 26 is connected to a constant current source 67 of any suitable construction and charged at a constant rate. A reset gated switch 68 connects the capacitor 26 to a reference or zero voltage line and is operable to reset the timing capacitor 26 to reference, which is generally zero volts. The switch 68 is connected to the zero crossing signal line to receive pulse 66, and reset the capacitor 26 to zero on the trailering edge 66b of pulse signal 66.

The reference capacitor 24 is connected into circuit and is set to the voltage level of the timing capacitor 26 just prior to the reset of the capacitor 26 to a reference zero level, as follows. A set switch 69 connects the reference capacitor 24 and to the zero crossing signal line to receive the pulse signal 66. The switch 69 is a gated switch and is turned on by the pulse signal 66. Actuation of the switch 66 completes a path from capacitor 26 to capacitor 24, which sets the capacitor voltage equal to the voltage of capacitor 26 just before capacitor 26 is reset. The signal on capacitor 24 is thereby set at a level directly proportional to the time between the last zero crossing and the current zero crossing, and the voltage is established at the reference level for the next winding to be fired.

Figure 3:
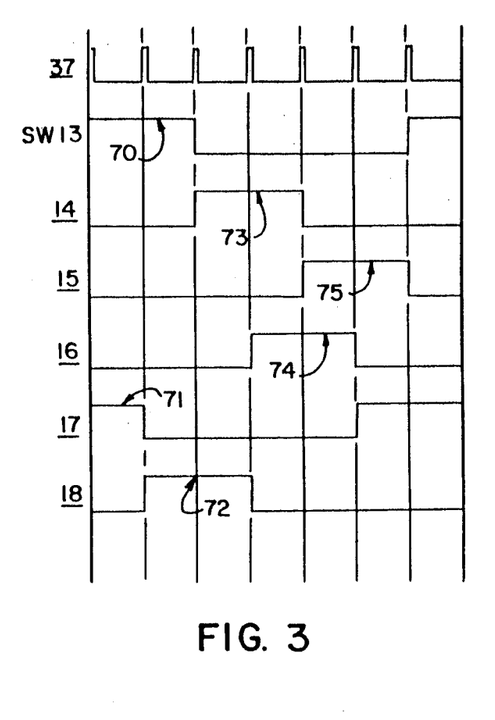
FIG. 3 is graphically illustrating of the switching and pulsing waveforms resulting from the control signal of FIG. 2.

A voltage divider network 70 including first and second resistors 71 and 72 is connected to the capacitor 24 to establish a percentage signal voltage at a signal line 73 which is a fixed percentage of the voltage on capacitor 24. Assuming a constant speed of rotor rotation, the fixed percentage signal identified a particular amplitude of the rotor rotation; namely, 30 degrees and therefore the position of the rotor relative to the windings. The signal at line 73 is therefore an accurate definition of the time at which to switch the connection of one of winding 4, 5 and 6 to another winding to establish and maintain the sequential energization of windings 4, 5 and 6 such as shown in FIG. 3, with each winding energized for 120 degrees of rotation in each complete revolution of the rotor 2, and more fully described hereinafter. The reference signal line 73 is connected to the negative input of comparator 27. The positive input of comparator is connected to capacitor 26. When capacitor 26 reaches the level of the voltage at line 73, the comparator 27 is driven on and produces the signal 27a and, as previously described, generates signal 37 to establish a switching output from controller 19.

The switching signals thus are applied to the controller 19. The illustrated controller 19 includes a ring counter 38 to sequentially recycle the group of six signals to the programmed decoder during each 360° revolution. Thus, the six signals are transmitted as a binary bit number to the programmed decoder, which decodes the signal and sequentially energizes the gates 52-54 and for sensing of the respective windings 4-5-6 and also triggers gates 56 and 61 to alternately transmit the appropriate positive going signal to the comparator 64 and creations of signals 37.

Referring particularly to FIGS. 2 and 3, the sequence of operation is described. FIG. 2 illustrates the operation of the tracking signal circuit and the timing circuit 25. FIG. 3 illustrates the actuation of the power switches 13-18, inclusive, to establish sequential pulsed energization of the windings 4, 5 and 6.

Referring to FIG. 3, the six switches 13 through 18 are identified on the Y-axis of the graphical illustration, with the closure of the switches shown by the increased level from reference. Switch 13 closure couples the positive dc power of supply 7 to winding 4. Switch 14 similarly couples positive power to winding 4 while switch 15 couples positive power to winding 6. Switches 16, 17 and 18 are actuated to connect the windings 4, 5 and 6 to the return side of supply 7 to complete the circuit to the several windings. The switches 13-18, inclusive, are actuated by controller 19 in accordance with the switching pulse signals 37 from the timing circuit 25.

Referring to FIG. 2, the timing circuit 25 is driven by the zero crossing detection circuit 41. The windings 4, 5 and 6 are sequentially de-energized and have the induced sine wave voltage defining the reference zero crossings. Each zero crossing creates a pulse signal 66.

Winding 4 is shown creating the first zero crossing, winding 6 the second and winding 5 the third, with the sequence repeating with continued forward rotation. The winding being monitored is controlled by the operation of gated switches 52, 53 and 54 in combination with switches 62 and 63. Thus, switch 52 is closed to detect each zero crossing of the induced voltage in winding 4, and switches 53 and 54 similarly closed, for windings 5 and 6. Switches 62 and 63 are alternately closed by the high and low signals in synchronism with each negative gain signal. Thus, when the signal to switches 62 and 63 is high, switch 62 transmits the zero crossing signal and where the signal is low, the inverter 65 closes switch 63 and transmits the zero crossing signal.

Each signal 66 is created at a zero crossing to set reference capacitor 24 and reset timing capacitor 26. The reset timing capacitor 26 is rapidly reset to zero reference and begins to charge at a constant rate as shown in FIG. 2. The capacitor charge reaches the reference capacitor charge level applied to the comparator 27 of FIG. 1, at essentially 30 degrees after the zero crossing, and creates the trigger or switching signal 37.

As shown in FIG. 3, the train of signals 37 are routed via the controller to sequentially actuate the power switches 13-18, inclusive. The pulse 37 created by the zero crossing of the winding 4 closes switch 13 to supply positive power to winding 4, as shown at 70, and opens switch 15 to remove power from winding 6. Switch 17 is closed to complete the return path, as shown at 71. Winding 6 is now de-energized and the zero crossing sequentially is monitored as shown in FIG. 2 and at its zero crossing creates signals 66 and 37 in the timing circuit and controller to open switch 17 and close switch 18 to complete the return circuit for the winding 4 through winding 6, as shown at 72. Thus, winding 5 is now de-energized and the induced voltage is monitored, as shown in FIG. 2.

The induced voltage in winding 5 passes through a zero crossing sixty degrees after the previous zero crossing and establishes the switching signal 37 which is decoded by the decoder to close switch 14 and supply positive power to winding 5 as shown at 73 and simultaneously turns off the power 70 from winding 4 by opening of switch 13. Winding 5 is now energized with the current returned through the still energized switch 18 and winding 6. Sixty degrees subsequent thereto a further signal 37 is generated by monitoring the induced voltage in the de-energized winding 4. That signal does not effect switch 14 but rather turns off switch 18 and turns on switch 16 thereby providing a return path for winding 5 through winding 4, as shown at 74. The subsequent zero crossing provides for de-energizing of winding 5 and supplying power to winding 6, as shown at 75. Each six pulse signals 37 provide for the sequential energizing of windings 4, 5 and 6 for 120 degrees of rotor rotation, at which time the cycle repeats to maintain the motor rotation.

For reverse rotation, the winding 5 is selected as the initial control winding such that the timing and power circuit reverses the energizing sequence to energize windings 5, 4, and 6 in a repetitive sequence to reverse the rotor rotation.

The capacitor control system of FIG. 1 can be constructed in an integrated circuit system using a single counter to record a signal proportional to the period between zero crossing and generating a commutating or switching signal based on a fixed percentage of such signal. A typical implementation adapted for IC circuitry is illustrated in FIG. 4.

The motor 77 is shown with the winding 4, 5 and 6 (as in FIG. 1) to switched power supply including power applying transistor 78 and parallel stabilizer diodes 78a.

Figure 4:
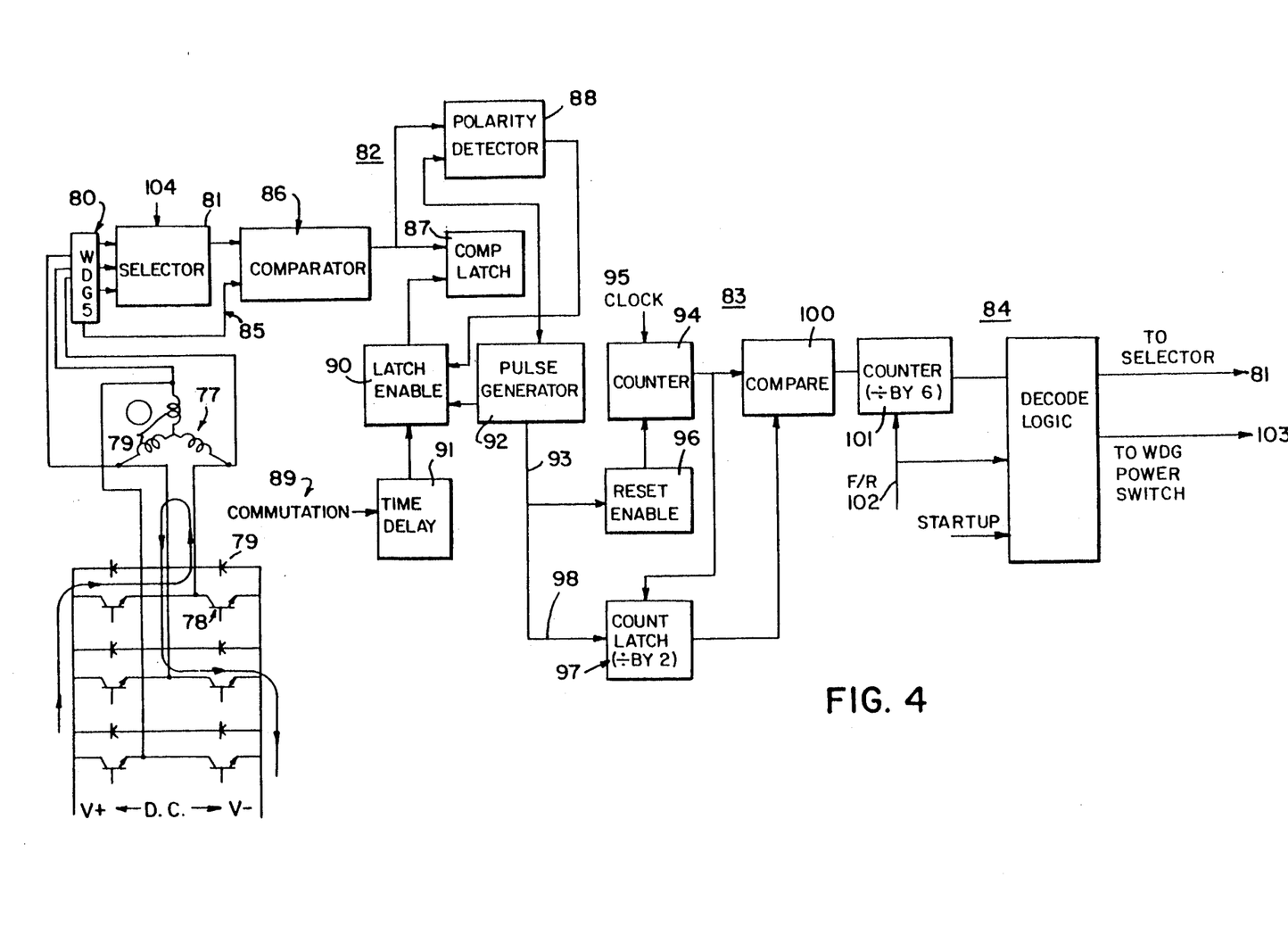
FIG. 4 is a block diagram illustrating an integrated digital embodiment of the invention shown in FIGS. 1-3.

FIG. 4 is a block diagram of the overall circuit. In FIG. 4, the motor windings 79 are shown connected to a winding selector unit 81 for sequentially monitoring the induced voltage in the windings. A zero crossing circuit or detector 82 monitors the particular signal transmitted via the selector and generates a crossing signal at each zero crossing. A digital measurement and timing unit 83 records a count equal to time between each zero crossing and generates a switch signal applied to controller 84. The integrated circuit thus includes the similar three basic components of the capacitor system of FIGS. 1-3. The zero crossing detector 82 includes a comparator 86 connected to the winding selector 81 and the neutral line 85 of stator winding to generate a crossing. The zero crossing signal is set or latched in a comparator signal latch circuit or unit 87 of detector 82 to store the signal. In the integrated circuit, the detector 82 includes a polarity detector 88 and a commutation detector 89 which are coupled to a latch enable unit 90 to control the latching of the zero crossing signal in the latch unit 87. The polarity detector 88 detects proper polarity in the output of the comparator 86 to insure the comparator has recovered from the prior condition. The commutater detector 89 detects the initiation of commutation and actuates a timer 91 which introduces a time delay to allow the current in the winding being de-energized to rapidly drop to zero. Thus, during the switching cycle, the current in the de-energized winding discharges through the conducting return switch 78 and the discharge diode 79 in parallel with the return switch 78 tied to the winding being de-energized.

The windings 4–6 of motor 77 are highly inductive and energy is stored in the core, not shown, of the winding during current flow in the winding. The energy must be dissipated when the winding is turned off to prevent damage to the system. In accordance with known functioning, the energy is rapidly dissipated by shorting the winding to ground or other suitable reference. In the illustrated embodiment, the conducting winding is connected to reference through the return switch to the common or reference line and a reverse diode. The current flow thus momentarily reverses in direction through the winding. The reversal creates a second zero crossing in the unenergized winding, which would create a false signal to the controller.

The timer is connected into circuit to effectively cancel the false zero crossing signal and insure repeated response to the actual zero crossing of the induced signal.

The comparator latch 87 is enabled when the commutation timer 91 times out and the polarity detector 88 signals the recovery of the comparator 86. The zero crossing signal is then latched into the comparator latch unit 87. The output of the comparator latch 87 is also coupled to the latch enable 90 after the switching is latched to prevent multiple zero crossing detection during a sampling period as might be caused by ripples in the waveform being sampled. The latch signal is impressed on a pulse generator 92 having a control line 93 to produce a single, fixed duration timing pulse, similar to pulse signal 66 of the first embodiment. The timing pulse is impressed on the digital measurement circuit 83.

The digital measurement circuit 83 includes a counter 94 having a control connected to a pulse source 95. A reset enable 96 for resetting the counter 94 is coupled to the pulse generator 92 and to counter 94. The output of the counter 94 is direct connected to a count latch unit 97 having a set input line 98 connected to the control line 93. The counter 94 is connected to a suitable clock 95 to provide a continuous count. The counter 94 is reset by unit 96 to initiate a count to reset the counter and initiate a new count from a reference. The clock may, for example, operate at 100 KHz providing an angle resolution of 300 Hz. This provides a count of 27 for each 30 degree intervals. The reset enable unit 96 resets the counter shortly after the reset enable circuit receives a signal from the zero crossing detector 82. The latch or set input line 98 responds to the zero crossing detector signal in common with the reset enable circuit latches the count in the counter in response to the generation of a zero crossing signal just prior to the counter reset. The latch unit 97 includes a divide-by-two circuit to establish an output equal to ½ the set count. Thus, the total period between zero crossing is 60 degrees. Therefore, dividing the count number by 2 defines a number equal to 30 degrees. The reset enable is operative after the momentary delay period, during which the latching of the count is made, to reset the counter, and the counter then initiates a new count.

A comparator 100 has a first input connected to the counter output of counter 94 and to the output of latch unit 97. When the counter number equals the latch unit number, the comparator 100 generates a commutation signal at its output. Thus, at the 50 percent count of latch unit 97, the rotor has rotated 30 degrees from the last zero crossing, and the induced signal intercept of the winding voltages is present, at which positive power is to be applied to the unenergized windings and simultaneously power is removed from the preceding phase winding.

At the next zero crossing, the above cycle is repeated with the resetting of the latch register and the resetting of the counter to again initiate a new count and measurement of the next zero crossing period.

The commutation pulse signal is applied to the programmer 84 which includes a divide-by-six counter unit 101. The count is divided by six to recycle each complete revolution during which the windings have been pulsed for the respective 120 degree periods of positive power application and appropriately switched to form the commutating return paths.

The decoder has a direction forward/reverse (F/R) input unit 102 coupled to a suitable manual or automated signal source, as in the first embodiment, to set the sequence selection of the windings for forward or reverse rotation.

The programmer is connected to a start-up pulse unit for initiating the rotation of the rotor with the measurement circuit disabled.

A start-up unit is coupled to the decoder unit to generate a series of apparent zero crossing signals which are time spaced to initiate the motor rotation. The start-up circuit produces the necessary signals to accelerate the rotor and thereby induce suitable voltages in the unenergized winding for generating the zero crossing signals. The pulse signals are preferably progressively increased in frequency in accordance with anticipated increase of acceleration of the motor. After a short period, such as one second, the rotor should be at a proper speed to induce a voltage in the unenergized winding at a suitable level for automatic generation of operative zero crossing signals. The generating of the start-up pulses ceases, the counter is coupled to sense the actual zero crossing, the windings are sequentially monitored and power is supplied in accordance with the zero crossings.

In the initial start mode, the motor is thus operated in a stepping mode with sufficient current supplied in time spaced pulses for driving of the motor at torque angles significantly less than 90°. In many applications such as ventilation loads, pump loads and the like, the torque is proportional to speed squared, thereby requiring relatively low torque input for the starting low speeds. A proper current can therefore be supplied to the motor without danger to the motor.

The output of the programmer includes the six gate signal lines 103 for selectively enabling the gated power switches 78, and winding selector lines 104 for selectively enabling the selector 81 for sensing the output of the unergized winding. The system of FIG. 4 thus sequentially de-energizes one winding and energizes the next proper winding at the precise time to create an optimum motor torque.

Various modes of carrying out the invention are contemplated as being within the scope of the following claims particularly pointing out and distinctly claiming the subject matter which is regarded as the invention.

I claim:

1. A commutated brushless dc motor comprising a stator with a plurality of circumferentially spaced stator windings, a rotor coupled to said stator and rotatably mounted to rotate relative to said stator winding as the result of energization of said windings, a dc power supply to establish pulsed energization of said windings in sequence with at least one winding de-energized, an alternating current induced signal being induced in said de-energized winding and having periodic zero crossings, a timing device coupled to the stator to monitor the time between the zero crossings of said induced signal and generating an electrical zero crossing signal proportional to such time, a signal latch unit coupled to said timing device and storing the zero crossing signal as a latched signal, a reset unit connected to said timing device to initiate a new timing cycle to generate a next zero crossing signal, and a comparator connected to said timing device and said latch unit and responsive to a proportion of the latched signal to generate said pulsed energization of said windings in a continuous repetitive sequence.

2. In the brushless motor of claim 1 wherein said induced signal has an alternating period of 360° and said stator includes three windings, each winding being commutated "on" to initiate pulsed energization at 30° in the induced signal and the respective related rotor rotation and commuted "off" at 150° to terminate said pulsed energization such that the three windings are sequentially pulsed energized for successive periods of 120° in each 360° rotation of said rotor.

3. In the motor of claim 1 wherein said timing device is a timing capacitor and a constant current charging circuit actuated by successive zero crossing signals and thereby establishing a timing capacitor charge equal to the period between zero crossings.

4. The motor of claim 3 wherein said timing device includes a reference capacitor coupled to said timing capacitor and set to a reference voltage equal to the voltage of the timing capacitor at each zero crossing, said comparator being connected to said timing capacitor and to said reference capacitor and creating a switching signal in response to a charge in said timing capacitor equal to a percentage level of the reference voltage on the reference capacitor.

5. The motor of claim 4 including a zero crossing detector having detection switch means to sequentially monitor the zero crossing of the stator windings, power switch means connected to sequentially connect said stator windings to power, a programmed decoder connected to said comparator and decoding the switching signals and generating power output signals to said power switch means for commutation of the stator windings and control signals to said detection switch means of the zero crossing detector to select the unenergized winding for monitoring the next zero crossing.

6. The motor of claim 5 wherein said comparator includes a first input connected to said timing capacitor and a second input, a voltage dividing network connected to said reference capacitor and having a reference output line connected to said second input, said comparator responding to a voltage on the timing capacitor equal to the reference voltage on said reference output line to generate said switching signal, a monostable circuit connected to said comparator to generate a sharp pulse signal.

7. A brushless dc motor having a rotor and a stator with at least three equicircumferentially spaced windings connected in a wye configuration in with a common center line and connected to a switched dc power supply and having separate switch units for selectively energizing said windings and thereby causing rotation of said rotor, said rotation of said rotor inducing an induced electrical signal in said windings, comprising a sensor coupled to said windings and responsive to a zero crossing of the induced electrical signal in said windings, a signal generator creating a control signal having a characteristic varying from a reference level proportionately with time, said signal generator including a reset unit for resetting said generator to said reference level, a control reference unit connected to said signal generator and set to correspond to said control signal and having an output corresponding to a selected percentage of the control signal, a trigger signal source connected to the output of said control reference unit and to said signal generator operable to establish a switching signals with said signal generator at a signal output equal to said selected percentage of said control signal, and said sensor being connected to said signal generator and operable to reset said signal generator at each of said zero crossings and thereby repetitively establish said control signal proportional to the period between successive zero crossing, and a circuit for connecting of said trigger signal source to said separate switch units and thereby establish sequential actuation of said separate switch units and pulsed energization of said windings.

8. The motor of claim 7 wherein said signal generator includes a power supply, a timing capacitor connected to said power supply and charged at a constant rate with time to establish said control signal, said sensor includes a zero crossing detector connected to said windings for generating a zero crossing signal at each zero crossing of said windings, said reset unit including a reset switch connecting said timing capacitor to said reference level at each zero crossing, a reference capacitor, a switch connecting said reference capacitor to said timing capacitor and setting said reference capacitor to a reference voltage, a proportional signal decoder coupled to said reference capacitor and establishing a control reference signal proportional to a fixed percentage of said reference voltage, said trigger signal source coupled to said proportional signal decoder and to said timing capacitor and generating a switching signal when said control signal of said timing capacitor corresponds to said reference signal.

9. The motor of claim 8 including a sequence controller for establishing sequential and cyclical energizing of said windings and for sequential and cyclical sensing the induced signal in said windings.

10. The motor of claim 7 including a counter having a reset element for setting the counter to a reference count and counting at a fixed rate from said reference count, said sensor connected to said windings and establishing a reset signal at each zero crossing of said induced signals in said windings, said sensor being connected to said reset element to reset said counter to the reference count at each zero crossing, a latch count unit connected to said counter and set to one half the count in the counter at each reset of the counter, a comparator to compare the count in said counter and in said latch count unit and operable to generate a trigger signal when the count in said counter equals the count in said latch count unit whereby said windings are sequentially energized for fixed periods related to the periods between said zero crossings and establishing a smooth continuous rotation of said rotor.

11. A controlled power supply for energizing a brushless dc motor having a rotor with circumferentially spaced magnetic poles and a stator with circumferentially spaced windings, comprising a switching device connected to said windings and having a plurality of input controls for sequentially energizing said windings and establishing an interacting magnetic field sequentially stepped about said rotor and thereby establishing rotation of said rotor, at least one of said windings being de-energized and having an induced signal induced therein as a result of the rotation of said rotor, said induced signal varying in a periodic manner with spaced zero crossings in accordance with the rotation of said rotor, a detector coupled to said windings and sequentially operably coupled to the de-energized windings to sense the induced signal in successive windings and thereby the position of the rotor relative to the stator, a timing device connected to said detector and generating a control signal directly proportionally to the period between said zero crossings, a signal dividing unit connected to said timing device and generating a fixed percentage signal for each successive control signal, a comparator connected to the signal dividing unit and to the timing device and generating a trigger signal with said control signal being equal to said fixed percentage signal, and a controller connecting said comparator to said input controls to actuate the switching device to sequentially energize the windings in response to the sequence of said trigger signals.

12. A brushless dc motor having a permanent magnet rotor and a stator with a plurality of equicircumferentially spaced windings having one inner end of the windings connected to a common line and each of the outer ends of the winding connected to a dc power supply, said windings being sequentially energized with dc power positively supplied to one of said windings and returned to said supply through a second of said windings, and said positive power being sequentially applied to said windings in one direction for forward rotation of said motor and in a reverse direction for reverse rotation of said motor, said rotor inducing an alternating sinusoidal induced voltage in the unenergized winding to be next energized, said induced voltage having two zero crossings in each voltage cycle, the improvement in a control for switching of said power supply to said windings, comprising a zero crossing detecting network connected to said windings for detecting the zero crossing of each induced voltage in said unenergized winding, a voltage reference line, said detecting network including a resistive coupling network including a separate first voltage resistor dividing branch connected to the end of each winding and to said voltage reference line and including a second voltage resistor dividing branch connected to said common line connection and said voltage reference line, a gate unit connected to each of said resistor dividing branches, said gate unit having a common output line, a first comparator amplifier having first input connected to said common output line and having a second input connected via the second voltage resistor dividing branch to said common line connection, an inverted amplifier to invert the output signal of said first comparator amplifier, a second comparator amplifier having a first input connected to said voltage reference line and having a second input, first and second transfer switches connecting said first comparator amplifier and said inverter amplifier to said second input of said second comparator amplifier, three detection switches connected one each to each of the first voltage resistor dividing branches, first and second transfer switches, a programmer coupled to sequentially actuate said three detection switches in sequence to sequentially couple the output of the windings to said first comparator amplifier and to alternately actuate said first and second transfer switches for alternately actuating such first and second transfer switches to establish a positive input signal to said second comparator amplifier and thereby generate a pulse output signal at each zero crossing of the unenergized winding and establishing a series of pulse signals precisely identifying the zero crossing points in the sinusoidal induced voltage in the unenergized winding and thereby the position of said rotor relative to said stator windings, a measurement and timing circuit including a timing device to create a time signal proportional to the period between successive zero crossing in said unenergized windings, a storage device to store the time signal and including a proportional output element to establish a reference signal equal to a percentage of said time signal which equals to the period between the last zero crossing and the next winding energization, a trigger comparator connected to said timing device and to said storage device and establishing a switching signal to said programmer in response to the input of said time signal and said reference signal.

13. The motor of claim 12 wherein said measurement and timing circuit includes a reference capacitor and a timing capacitor, a constant current source, said timing capacitor being connected to said constant current source for charging said timing capacitor at a preselected constant rate, a first gated switch connected to said timing capacitor to discharge said timing capacitor, a second gated switch connected to said reference capacitor and to said timing capacitor to set said reference capacitor at the charge level of said timing capacitor, said first and second gated switches having inputs connected to the output of said zero crossing detecting network and having said second gate switch actuated for a momentary period prior to actuation of the first gated switch to thereby set the reference capacitor to the charge set on the timing capacitor and to immediately thereafter discharge the timing capacitor, a reference voltage dividing network coupled to said reference capacitor and establishing a proportional reference voltage signal equal to the voltage created in said timing capacitor in a selected rotation of said rotor, said trigger comparator having a first input connected to said reference voltage dividing network and a second input connected to said timing capacitor, said trigger comparator establishing an output when the output of said timing capacitor equals the proportional signal from said reference voltage dividing network.

14. The motor of claim 13 wherein said measurement and timing circuit includes a starting circuit for generating a fixed series of pulses independent of said pulse output signal at each zero crossing to initiate operation of said motor to establish operative zero crossing signal pulses, comprising a start voltage dividing network connected to said power supply, a start comparator having a first input connected to said start voltage dividing network and to said timing capacitor, the output of the start comparator developing a train of pulses for controlling the starting of said motor, an OR gate connected to said start comparator and to said trigger comparator and thereby establishing a train of pulses when generated from either of said start comparator or said trigger comparator, said starting circuit being established whereby said timing capacitor is reset by said zero crossing signal pulse prior to the level on said timing capacitor rising to the level for actuating said start comparator.

15. The motor of claim 13 wherein said programmer includes a recycling counter to establish a series of pulse signals with one pulse for each zero crossing of said induced voltage during each revolution of said motor and to repetitively count said pulses in sequential count cycles, said programmer including a decoder to decode the pulse position in each said count cycle and establish sequential actuation of the switches of said zero crossing detecting network to sequentially activate the unenergized winding, said decoder including switch output lines coupled to actuate said detection switches and said first and second transfer switches to selectively supply the power to said windings in sequence.

16. The motor of claim 15 wherein said power supply includes positive power switches, one for each of said windings and connected between said power source and the end of said corresponding winding, return switches connected between said positive power switches and said power supply to form a return path for the power through one and a second winding, said decoder actuating one of said positive power switches and one of said return switches to establish the flow through said windings.

* * * * *

UNITED STATES PATENT AND TRADEMARK OFFICE
CERTIFICATE OF CORRECTION

PATENT NO. : 5,068,582
DATED : November 26, 1991
INVENTOR(S) : KENNETH C. SCOTT

It is certified that error appears in the above-identified patent and that said Letters Patent is hereby corrected as shown below:

Claim 7, Col. 13, Line 42, after "configuration" delete "in".

Signed and Sealed this

Twenty-third Day of March, 1993

Attest:

STEPHEN G. KUNIN

*Attesting Officer*     Acting Commissioner of Patents and Trademarks